United States Patent [19]

Van de Ven et al.

[11] Patent Number: 5,114,784
[45] Date of Patent: May 19, 1992

[54] MOLDING MADE FROM A FOAM PLASTIC, AND THE PRODUCTION THEREOF

[75] Inventors: Henricus J. M. Van de Ven; Erik de Haan, both of Arnhem, Netherlands

[73] Assignee: Akzo N.V., Velperweg, Netherlands

[21] Appl. No.: 607,672

[22] Filed: Nov. 1, 1990

[30] Foreign Application Priority Data

Nov. 7, 1989 [DE] Fed. Rep. of Germany ....... 3937107

[51] Int. Cl.$^5$ ................................................. B32B 3/26
[52] U.S. Cl. .................................. 428/246; 428/304.4; 428/316.6; 428/319.3
[58] Field of Search .................. 428/246, 304.4, 319.3, 428/316.6

[56] References Cited

U.S. PATENT DOCUMENTS 4,264,761  4/1981  McGirk ............................... 428/480

FOREIGN PATENT DOCUMENTS

| 349962 | 1/1990 | European Pat. Off. . |
| 2227143 | 12/1973 | Fed. Rep. of Germany . |
| 2941598 | 4/1981 | Fed. Rep. of Germany . |
| 3506230 | 7/1986 | Fed. Rep. of Germany . |
| 3542813 | 6/1987 | Fed. Rep. of Germany . |
| 3837057 | 5/1989 | Fed. Rep. of Germany . |
| 3739843 | 11/1989 | Fed. Rep. of Germany . |
| 1353325 | 1/1964 | France .............................. 428/319.3 |
| 2006667 | 5/1979 | United Kingdom . |

OTHER PUBLICATIONS

Knipp et al, "Tiefgezogene Bezuge mit hinterschaumten Polstern", *Gummi–Asbest Kunststoffe*, No. 10, 1972, pp. 923-926.

*Primary Examiner*—William J. Van Balen
*Attorney, Agent, or Firm*—Oliff & Berridge

[57] ABSTRACT

Moldings made from foam plastic having an integrated covering of a laminate having a layer of certain copolyether esters. These are, in particular, foam-molded mattresses and cushions for furniture and vehicles, in particular car seats. Compared with the corresponding known moldings, having a polyurethane layer, they are distinguished by lower processing shrinkage and good bonding of the copolyether ester layer to the polyurethane core.

11 Claims, 2 Drawing Sheets

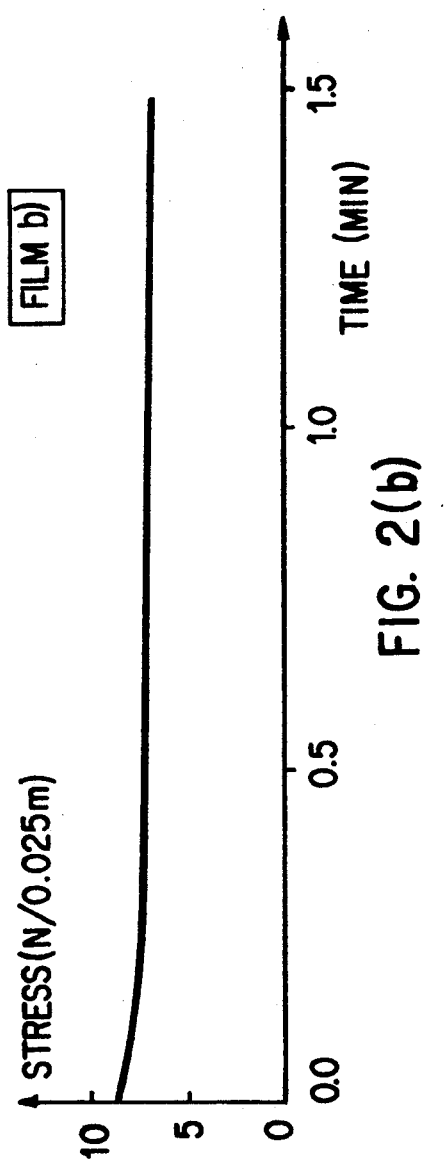
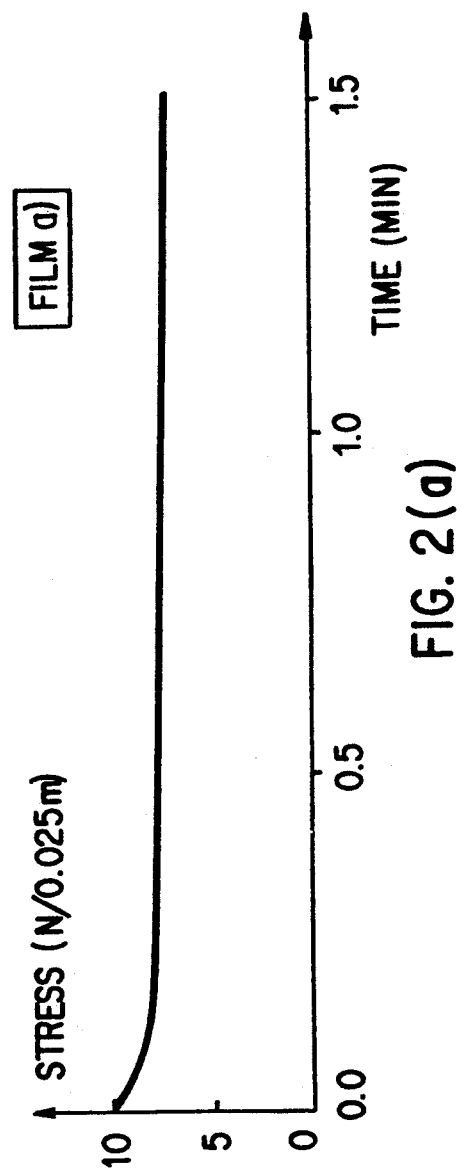

MOLDING MADE FROM A FOAM PLASTIC, AND THE PRODUCTION THEREOF

BACKGROUND OF THE INVENTION

1. Technical Field

The invention relates to a molding made from a foam plastic having an integrated covering, and the production thereof by forming a covering material web with subsequent foaming.

The invention thus relates to actual articles, such as foam-molded mattresses and cushions for furniture and vehicles, in particular car and aircraft seats.

The term "molding made from a foam plastic" is taken to mean an article molded from a compacted foam of a synthetic polymer.

The term "integrated covering" is taken to mean a covering bonded to the foam plastic over its entire surface, as produced in foam molding, i.e., without addition of a binder and without hot-melt bonding of two prefabricated solid articles.

The term "forming" is taken to mean the deformation of a covering material web under the influence of external forces and possible heat in a mold.

"Foaming" preferably starts from liquid starting materials for the preparation of polyurethane. The foamable mixture is introduced into the formed covering. Even during production, the plastic being generated is converted into the cell structure (foam and bonded to the covering.

2. Description of the Related Art

Moldings made from a foam plastic having an integrated covering are known.

DE-A 22 27 143 discloses seat cushions made from a foam plastic which have an extensible textile cover with a sealing layer of an elastomer, the foam plastic being produced in situ by a cold-foaming recipe. The sealing layer preferably comprises a thermoplastic polyurethane elastomer or a layer of a plasticized polyvinyl chloride provided with, for example, a polyurethane solution coating on the side facing the foam (see page 4, paragraph 2, and page 5, final paragraph). In addition, a soft polyurethane foam film may be arranged between the textile cover and the sealing layer comprising a film. A laminate of this type is shaped by means of a vacuum. The cavity produced is then foamed.

The journal "Gummi-Asbest-Kunststoffe", No. 10, 1972, on pages 923 to 926, describes foam plastic moldings of the generic type, produced by forming and back foaming textile sheet-like structures sealed to polyurethane and polyvinyl chloride.

DE-C 35 06 230 describes seats and seat back cushions produced by vacuum forming and back foaming an air-permeable covering and an air-impermeable film, the covering and the film not being bonded to one another until during the forming. The film should be extensible and bondable (see column 2, lines 56 and 57); the polymer it comprises is not stated.

GB-A 2,006,667 describes the production of coverings for cushions, for example for car seats, chairs, furniture and beds. The coverings are laminates having a textile layer, a plastic foam layer and possibly a thermoplastic film. The latter can be produced from polyvinyl chloride, polyethylene or polyurethane (see page 3, lines 11-15). The laminate is mechanically formed (see claim 1, page 2, lines 26-28), preferably at from 150° to 220° C. It can then either be combined with the separately produced foam plastic or back foamed (see page 2, lines 8-13).

The known moldings do not always satisfy demands on the service properties; in particular their shrinkage is considerable and/or the bonding of the layers of the covering to one another and to the foam plastic is unsatisfactory.

SUMMARY OF THE INVENTION

The invention is intended to remedy the above and other shortcomings of the prior art.

It is an object of the invention to provide foam plastic moldings which are as dimensionally accurate as possible and have a fold-free, firmly bonded covering.

It is a further object of the invention to realize these properties in a simple and inexpensive process.

The present invention achieves these and other objects by providing moldings made from foam plastic having an integrated covering comprising a laminate having a layer of certain copolyether esters.

BRIEF DESCRIPTION OF THE DRAWINGS

A more complete understanding of the invention can be obtained by reference to the drawings, wherein:

FIGS. 2(a) and 2(b) are graphs showing resilience of a film of the invention and a known polyurethane film.

DETAILED DESCRIPTION OF PREFERRED EMBODIMENTS

Figure 1B:
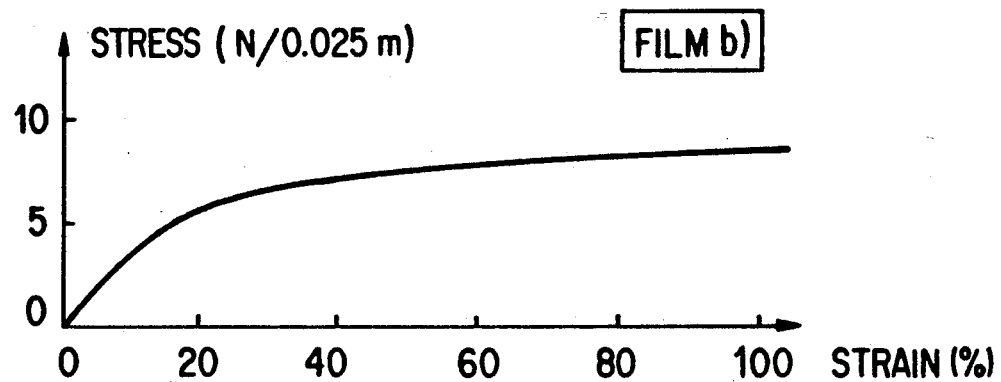
FIGS. 1(a) and 1(b) are graphs showing stress/strain behavior of a film of the invention and a known polyurethane film.

The term "laminate" is taken to mean a plurality of layers bonded to one another. The bonding may be, for example, over the entire surface or part of the surface, with or without bonding agents.

The term "layer" is taken to mean a uniform material extending in a flat manner at a certain height above, below or between others. It can be, for example, a film, a textile or a paste.

A decisive factor in the solution according to the invention was the choice of copolyether ester, which comprises a multiplicity of recurring intralinear long-chain ester units and short-chain ester units connected randomly head-to-tail by ester bridges, the long-chain ester units conforming to the formula

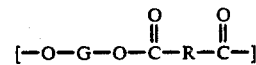

and the short-chain ester units conforming to the formula

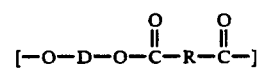

in which G is a divalent radical produced by removing terminal hydroxyl groups from at least one long-chain glycol which has a molecular weight in the range from 800 to 6000 and has a carbon:oxygen atomic ratio in the range from 2.0 to 4.3, at least 15% by weight of the long-chain glycol having a carbon:oxygen ratio in the range from 2.0 to 4.0, R is a divalent radical produced by removing carboxyl groups from at least one dicarboxylic acid having a molecular weight of less than 300, and D is a divalent radical produced by removing hydroxyl groups from at least one diol which has a molecular weight of less than 250, at least 80% of the dicarboxylic acid used comprising terephthalic acid or an ester-forming equivalent thereof, and at least 80 mol % of the low-molecular weight diol comprising 1,4-butanediol or an ester-forming equivalent thereof, the sum of the mole percentages of the dicarboxylic acid other than terephthalic acid or an ester-forming equivalent thereof and of the low-molecular-weight diol other than 1,4-butanediol or an ester-forming equivalent thereof being not greater than 20, and the short-chain ester units forming from 40 to 85% by weight of copolyether ester. It is advantageous for at least 15% by weight of the long-chain glycol to have a carbon:oxygen ratio in the range from 2.0 to 2.7. It is particularly advantageous to select a film having a thickness of from 10 to 30 μm, preferably from 20-30 μm, comprising a copolyether ester containing from 15 to 50% by weight of polyethylene glycol (PEG) as the long-chain glycol, based on the sum of the amounts of long-chain glycol and short-chain ester (PBT) plus 1 mol of terephthalate. Finally, an advantageous embodiment of the invention relates to the laminate produced therefrom, having an additional textile layer and/or having a soft polyurethane foam film. The laminate is preferably produced using a soft polyurethane foam film having a thickness of from 3 to 12 mm. The thickness of this layer in the finished laminate may be lower, for example in the range from 1.5 to 6 mm, depending on the production conditions.

Preferred embodiments are characterized by the following features, both individually and with a plurality of features combined:

The laminate contains a textile layer and/or a foam plastic layer and the copolyether ester layer in said sequence. However, a two-layer laminate, for example comprising the textile and the copolyether ester, is also possible.

The copolyether ester preferably contains from 15 to 50% by weight of polyethylene glycol (PEG), based on the sum of the amounts of long-chain glycol (PEG) and short-chain esters (PBT) plus 1 mol of terephthalate.

Although the copolyether ester layer can also be obtained by coating or impregnating the textile or the foam plastic layer with an appropriate solution, paste or dispersion, it is preferably obtained by laminating on an appropriate copolyether ester film.

The film should have a thickness of from 10 to 30 μm, preferably from 20 to 30 μm. It may be thinner or thicker, but not quite such favorable results are then obtained. The more uniform the film thickness, the thinner the film can be.

Suitable textiles are wovens, nonwovens and, in particular, knitted fabrics. They can be produced from fully stretched, but also from partially stretched or even unstretched, continuous filaments. It is also possible to employ flock materials.

The foam plastic layer is preferably a soft polyurethane foam film. Bonding thereof to the film on the one hand and, if appropriate, the textile on the other hand is preferably effected by flame lamination in such a manner that soft bonding over the entire web is achieved.

Although forming can also take place mechanically using a punch, it is preferably carried out using superatmospheric pressure or vacuum in suitable molds. The latter (vacuum method) is preferred.

The forming can take place at room temperature or slightly elevated temperature, e.g. at up to 50° C. The temperature to be used expediently depends on the foaming conditions.

The copolyether ester layer back-foamed according to the invention is distinguished by the following properties:

It is bonded surprisingly strongly both to the soft polyurethane foam film and to the polyurethane foam core.

It surprisingly gives moldings of accurate shape, even under mild production conditions, such as low temperature, vacuum and short times. The difference in dimensions between the mold and the corresponding molding immediately after demolding (processing shrinkage) is very small.

Even if considerable elongations of, for example, 50%, are used during production, the polyurethane reaction mixture does not penetrate through the laminate, in spite of the relatively low thickness.

It is impermeable to water and air, but permeable to water vapor. This achieves both high comfort in use, and facilitates easy cleaning.

Accordingly, the following moldings made of foam plastic having an integrated covering are of particular importance: mattress for hotels and hospitals, and, in particular, seats for means of transport, such as aircraft, trains and cars. They can easily be produced with a pronounced profile, are easy to care for, since water only moistens the surface, and, in addition, are permeable to water vapor. In the case of seats, a durable, fold-free covering is important.

In very general terms, the laminates having a copolyether ester layer which have been back-foamed according to the invention can be produced as follows (see also "Gummi-Asbest-Kunststoffe" No. 10, 1972, pages 923 to 926):

The preparation of suitable copolyether esters is described in EP-A 0 111 360. These copolyether esters have good stability to hydrolysis. EP-A 0 111 360 is herewith expressly incorporated in full into this description. The preparation of the films is also described therein.

The textile employed is generally a woven fabric or knitted material, for example made of fibers or filaments of fully synthetic polymers, in particular from polyethylene terephthalate or nylon 6 or 66. It is also possible to use elastomer filaments.

The soft polyurethane foam film optionally used in the production of the moldings preferably has a thickness of from 3 to 12 mm. It is prepared by generally known processes.

The laminate comprising the copolyether ester film, the textile and/or soft foam film is generally produced by flame lamination. In this method, only the surfaces of the foam cell boundaries are melted, so that spot bonding over the entire surface is achieved. In spite of good bonding, the elasticity, flexibility and permeability are therefore retained.

The laminate is formed in a known manner by means of a vacuum in suitable molds, preferably at elevated temperature. A process of this type is described, for example, in DE 35 06 230 and DE 36 13 879.

The formed covering is then foamed in a known manner, preferably by the cold foaming process at mold temperatures between 30° and 60° C., liquid starting materials for the preparation of polyurethane being poured into the resultant cavity, see Kirk-Othmer, Encyclopedia of Chemical Technology, second edition, Vol. 21, pages 84 to 94 (19), or Becker/Braun, Kunststoff Handbuch (Plastics Handbook), volume 7 (Polyurethanes), Hauser Verlag, Munich, Vienna (1983).

EXAMPLE

A 25 μm thick film of copolyether ester containing 30% of PEG of molecular weight 4,000 is produced. This film a) which is to be used according to the invention is compared with a known 53 μm thick film b) of type U 03 polyurethane from Plate, Bonn.

Figure 1A:
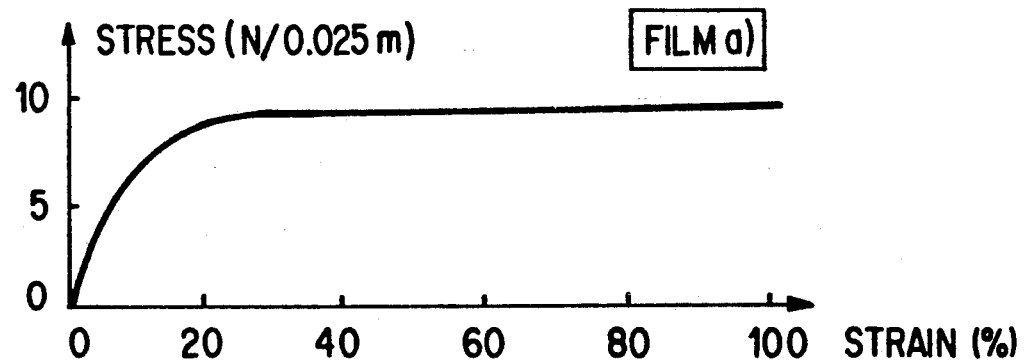

The stress/strain behavior of the two films was investigated using strips measuring 200×25 mm (clamped lengths 50 mm; stretching 100% at a rate of 5 cm/min.; 20° C.; Instron tensile tester). The diagrams obtained are reproduced in the drawing (FIGS. 1 (a) and (b)). They show that it is more difficult to stretch the film a) according to the invention than the known polyurethane film b). The resilience (FIGS. 2(a) and (b)) of the film a) according to the invention, at 7.0 N, is also greater than that of the known polyurethane film b), at 6.6 N, after a dwell time of 1.5 minutes. For these two reasons, a greater difference was expected between the dimensions of the molding and of the mold for the laminate containing the copolyether ester film a) than in the case of the known film b). However, the opposite is observed by laminating the film with polyurethane soft foam film (final thickness 2 mm) and with a knitted velour containing an additional chain of Lycra ® elastomer filaments (Frontier type), then vacuum forming the resultant laminate at a mold temperature of from 40° to 45° C., subsequently effecting foaming for 4 minutes at from 40° to 45° C. using polyol/diisocyanate and blowing gas (reaction mixture for the preparation of polyurethane), and finally demolding after 5 minutes.

In spite of the relatively low thickness, the foam mixture is not penetrated by the covering.

The bonding of the copolyether ester film is unexpectedly strong, both to the polyurethane soft foam film and to the polyurethane foam core.

What is claimed is:

1. A molding made from a foam plastic having an integrated covering comprising a laminate having a layer of a copolyether ester which comprises a multiplicity of recurring intralinear long-chain ester units and short-chain ester units connected randomly head-to-tail by ester bridges, the long-chain ester units conforming to the formula

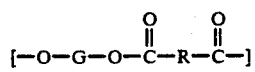

and the short-chain ester units conforming to the formula

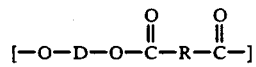

in which G is a divalent radical produced by removing terminal hydroxyl groups from at least one long-chain glycol which has a molecular weight in the range from 800 to 6000 and has a carbon:oxygen atomic ratio in the range from 2.0 to 4.3, at least 15% by weight of the long-chain glycol having a carbon:oxygen ratio in the range from 2.0 to 4.0, R is a divalent radical produced by removing carboxyl groups from at least one dicarboxylic acid having a molecular weight of less than 300, and D is a divalent radical produced by removing hydroxyl groups from at least one diol which has a molecular weight of less than 250, at least 80% of the dicarboxylic acid used comprising one of terephthalic acid and an ester-forming equivalent thereof, and at least 80 mol % of the low-molecular weight diol comprising one of a 1,4-butanediol and an ester-forming equivalent thereof, the sum of the mole percentages of the dicarboxylic acid other than terephthalic acid or an ester-forming equivalent thereof and of the low-molecular-weight diol other than 1,4-butanediol or an ester-forming equivalent thereof being not greater than 20, and the short-chain ester units forming from 40 to 85% by weight of copolyether ester.

2. The molding as claimed in claim 1, wherein at least 15% by weight of the long-chain glycol has a carbon:oxygen ratio in the range from 2.0 to 2.7.

3. The molding as claimed in claim 1, wherein the long-chain glycol is polyethylene glycol, and its proportion is from 15 to 50% by weight, based on the sum of the amounts of long-chain glycol and short-chain ester units plus 1 mol of terephthalate.

4. The molding as claimed in claim 3, wherein the portion of polyethylene glycol is from 15 to 33% by weight.

5. The molding as claimed in claim 1, wherein the copolyether ester layer is a film having a thickness of from 5 to 50 μm.

6. The molding as claimed in claim 1, wherein the copolyether ester layer is a film having a thickness of from 10 to 30 μm.

7. The molding as claimed in claim 1, wherein the copolyether ester layer is a film having a thickness of from 20 to 30 μm.

8. The molding as claimed in claim 1, wherein the copolyether ester layer is a constituent of a laminate additionally containing at least one of a textile layer and a foam plastic layer.

9. The molding as claimed in claim 1, which is a car seat or a mattress.

10. The molding as claimed in claim 1, produced by forming a covering material web and foaming the resultant material.

11. The molding as claimed in claim 10, produced by vacuum forming.

* * * * *